United States Patent [19]

Harford

[11] 4,185,299
[45] Jan. 22, 1980

[54] SYNCHRONIZATION SIGNAL SEPARATOR CIRCUIT

[75] Inventor: Jack R. Harford, Flemington, N.J.

[73] Assignee: RCA Corporation, New York, N.Y.

[21] Appl. No.: 934,821

[22] Filed: Aug. 18, 1978

[51] Int. Cl.² .............................................. H04N 5/08
[52] U.S. Cl. ..................................................... 358/153
[58] Field of Search ................ 358/153, 155, 156, 157

[56] References Cited

U.S. PATENT DOCUMENTS

| | | | |
|---|---|---|---|
| 3,524,021 | 8/1970 | Hickok | 178/7.3 |
| 3,706,847 | 12/1972 | Smeulers | 358/153 |
| 3,869,568 | 3/1975 | Ueda et al. | 178/7.3 |

FOREIGN PATENT DOCUMENTS 2409861 9/1974 Fed. Rep. of Germany.

Primary Examiner—Robert L. Richardson
Attorney, Agent, or Firm—Eugene M. Whitacre; William H. Meagher; W. Brinton Yorks, Jr.

[57] ABSTRACT

A synchronization signal separator circuit is provided for separating the synchronizing signal components of a composite video signal. A composite video signal containing negatively-directed synchronizing pulse components is coupled to one input of a differential amplifier comprising two transistors of one conductivity type, and to the base electrodes of a peak detector charging transistor of opposite conductivity type. The charging transistor charges a peak detecting capacitor to a reference level which establishes the slicing level of the sync separator. The base-to-emitter voltage of the charging transistor offsets the slicing level by one $V_{be}$ relative to the sync pulse tips, thereby ensuring that the slicing level is offset from the sync tip level. The peak detecting capacitor is coupled to a second input of the differential amplifier, where the slicing level is compared with the composite video signal for separation of the sync pulses. A current source resistor is also provided, which is the sole source of charging current for the peak detecting capacitor between sync pulse intervals. The charging current allows the slicing level to vary so as to follow changes in video signal level. The sync separator recovery circuit is provided which is keyed to cause the slicing level to change rapidly in response to sudden changes in signal level.

20 Claims, 18 Drawing Figures

SYNCHRONIZATION SIGNAL SEPARATOR CIRCUIT

This invention relates to synchronization signal separator circuits, and more particularly to a peak detecting sync separator circuit which generates a sync signal from the synchronizing signal components of a composite video signal. The circuit may be fabricated in integrated circuit form, with an external resistor and capacitor. The variation in the sync slicing level between sync pulses is controlled by the external capacitor and resistor, independent of the characteristics of the integrated circuit. The output sync signal remains stable when the peak detector is charged to the peak of the synchronizing signal component. An illustrative embodiment of the invention includes means for adjusting the slicing level at which sync is detected, and means for preventing degradation of the output signal in the presence of thermal noise.

In accordance with television transmission standards, the composite video signal includes periodically recurring horizontal and vertical synchronizing pulses for synchronizing the scanning circuits associated with the kinescope in a television receiver and the scanning circuits associated with the image pick-up device at the television transmitting station. In the composite video signal, the horizontal and vertical synchronizing pulses all are of substantially the same amplitude with respect to a reference level, the reference level being defined in terms of a particular brightness condition (e.g., an arbitrary black level) in the televised image. Television receivers include a synchronizing signal separator circuit capable of differentiating between the reference or black level of the video signal and the tips of the synchronizing pulses so as to strip off or respond only to signals in a range commencing at or near the reference black level and including the sync pulses.

A circuit which has been found to be especially advantageous for separation of the sync pulses of a composite video signal includes a peak detector and a comparator network. The peak detector stores a reference level which is related to the peak level, or tips, of the sync pulses. The reference level is coupled to the comparator network, which compares the composite video signal to the reference level. The circuit is designed so that only the sync pulse components of the composite video signal exceed the reference level. The reference level is commonly referred to as a "slicing level", since it appears to cut through, or slice, the sync pulses at a level intermediate to the sync tips and the reference black level. When the slicing level slices through the sync pulses, the comparator produces a sequence of separated synchronizing pulses.

Care must be taken in the design of the peak detecting sync separator to ensure that slicing level does not vary substantially, or ripple, between sync pulses. A rippling slicing level can cause phase modulation of the separated sync pulses, resulting in bends, or tilting of the television image. If the slicing level exceeds the sync tip level, the sync separator will only detect and separate a portion of the sync pulses, or may fail to separate the pulses altogether. On the other hand, if the slicing level falls to a level which is at or below the reference black level, the sync separator will detect and separate the black level of the video signal as sync pulses. However, the slicing level must be allowed to vary slightly, so as to follow variations in video signal level due to signal fading, channel changes and airplane flutter.

In accordance with one aspect of the present invention, a synchronization signal separator circuit is provided for separating the synchronizing signal components of a composite video signal. A composite video signal containing negatively-directed synchronizing pulse components is coupled to one input of a differential amplifier comprising two transistors of one conductivity type, and to the base electrode of a peak detector charging transistor of opposite conductivity type. The charging transistor charges a peak detecting capacitor to a reference level which establishes the slicing level of the sync separator. The base-to-emitter voltage of the charging transistor offsets the slicing level by one $V_{be}$ relative to the sync pulse tips, thereby ensuring that the slicing level is offset from the sync tip level. The peak detecting capacitor is coupled to a second input of the differential amplifier, where the slicing level is compared with the composite video signal for separation of the sync pulses. A current source resistor is also provided, which is the sole source of charging current for the peak detecting capacitor between sync pulse intervals. The charging current allows the slicing level to vary so as to follow changes in video signal level.

With the exception of the peak detecting capacitor and the current source resistor, the balance of the sync separator may be advantageously fabricated in integrated circuit form on a monolithic integrated circuit chip. The values of the external capacitor and resistor may be varied to permit adjustment of the slicing level ripple, independent of the characteristics of the integrated circuit portion of the sync separator circuit.

In accordance with another aspect of the present invention, a sync separator recovery circuit is provided which is keyed to cause the slicing level to change rapidly in response to large, sudden changes in signal level. The recovery circuit is keyed by a keying pulse derived from the horizontal retrace (flyback) pulse of the horizontal deflection system when the sync separator has failed to separate a sync pulse concurrent therewith. Current from the recovery circuit is applied to the peak detecting capacitor to rapidly change the slicing level in a direction which permits the detection of sync pulses from a lower level video signal.

When the sync separator is designed to detect the sync pulses of a very low level video signal, it may be desirable to modify the one $V_{be}$ offset of the slicing level relative to the sync tip so as to slice the sync pulses at a level closer to the sync tip. The present invention allows adjustment of the slicing level by the provision of a voltage divider at the video signal input of the differential amplifier. The setting of the voltage divider permits adjustment of the D.C. level at the video signal input to the differential amplifier relative to the slicing level on the other input, thereby allowing the slicing level to be located closer to the sync tips.

When the sync separator operates at very low video signal levels, the signal-to-noise ratio of the video signal degrades as the video signal approaches the thermal noise level. The sync separator then becomes susceptible to thermal noise "set-up", in which the peak detector stores the peak value of the thermal noise riding on the sync tip, instead of the D.C. level of the sync pulse. The problem of thermal noise set-up is aggravated by moving the slicing level closer to the sync tip and thus into the thermal noise region. In accordance with a further aspect of the present invention, thermal noise set-up is minimized by the use of a charging transistor in the peak detector having a bandwidth which is substantially less than that of the incoming composite video signal. The narrow bandwidth transistor effectively attenuates impulse noise and thermal noise in the video signal. Provision is made in the present invention for additional circuit elements which present a high impedance to high frequency thermal noise components in the peak detector, and shift the slicing level away from the thermal noise peaks and toward the D.C. level of the sync tip. Finally, an output network is coupled to the differential amplifier to attenuate noise components in the output sync pulses by imparting a fast risetime to the leading edges and a slow decay to the trailing edges of the output sync pulses.

In the accompanying drawings:

FIG. 1 illustrates video signal and slicing level waveforms of an ideal sync separator;

FIGS. 2(a) and 2(b) illustrate input and output waveforms of a prior art sync separator;

FIGS. 3(a) and 3(b) illustrate input and output waveforms of another prior art sync separator;

FIGS. 4(a) and 4(b) illustrate input and output waveforms of a third prior art sync separator;

Figure 7A:
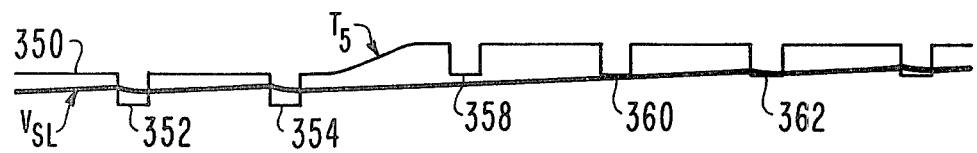
Figure 7B:
Figure 5:
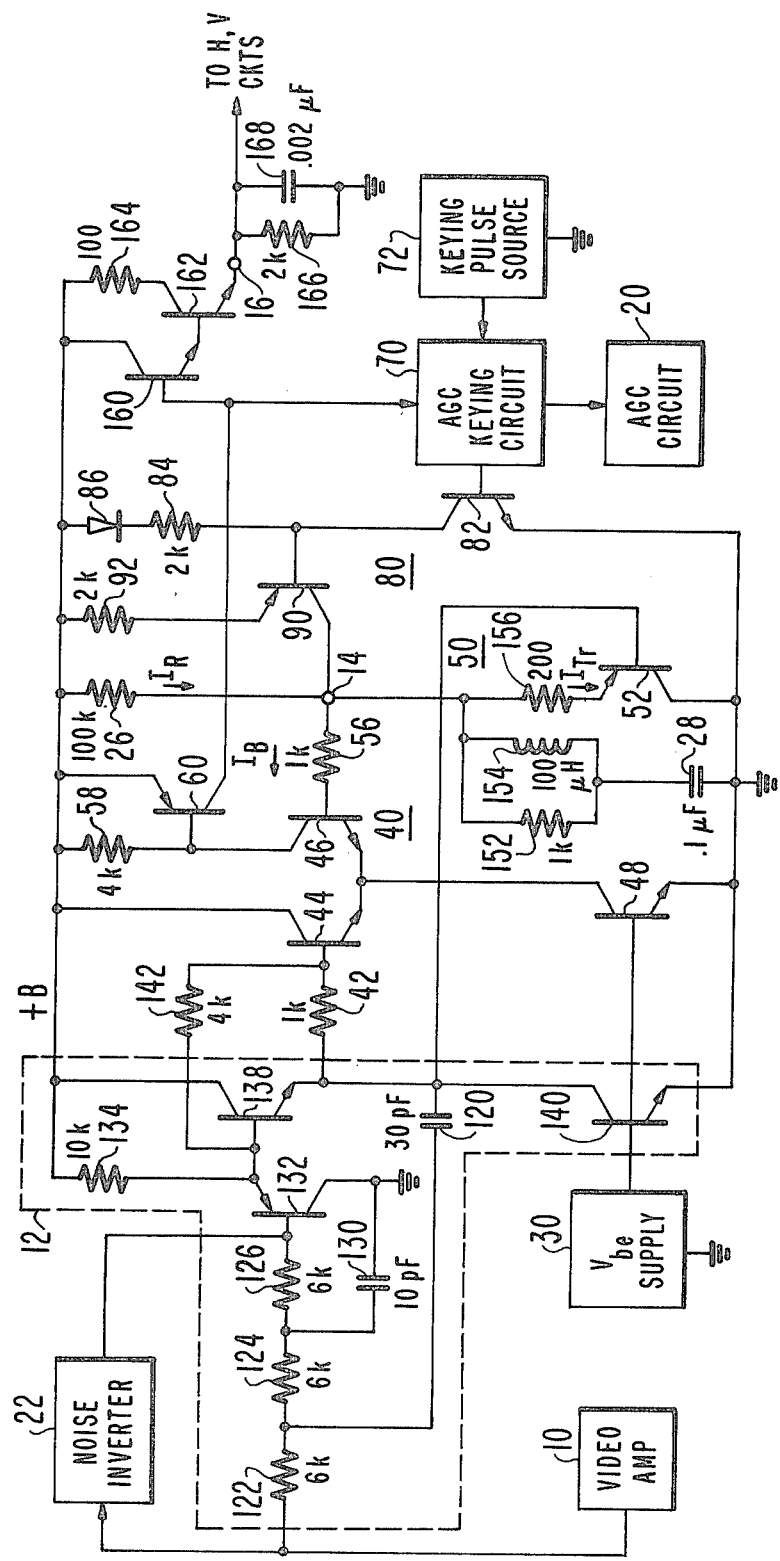
FIG. 5 illustrates, partially in block diagram form and partially in schematic diagram form, a sync separated circuit constructed in accordance with the principles of the present invention.
Figure 8A:
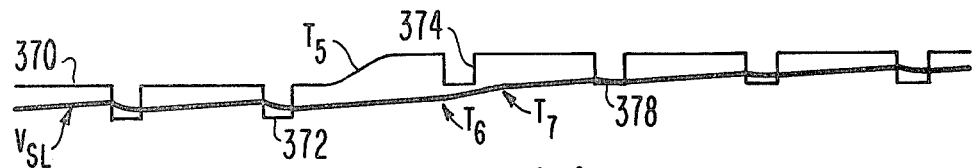
Figure 8B:
Figure 9A:
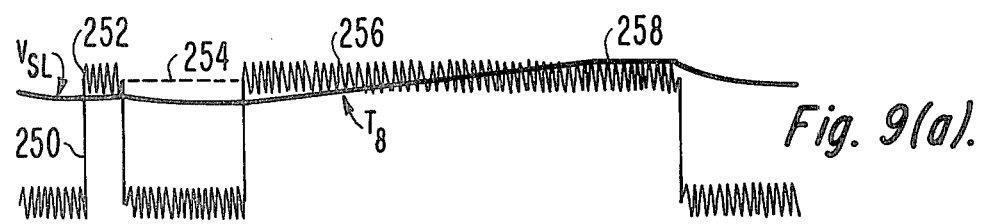
Figure 9B:
Figure 10A:
Figure 10B:
Figure 10C:
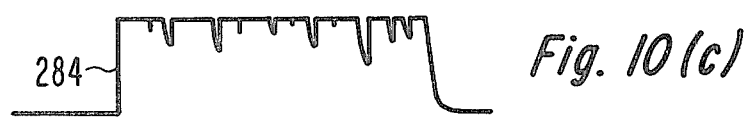

FIGS. 7(a) and 7(b) illustrate input and output waveforms depicting the operation of a sync separator without the sync separator recovery circuit of the present invention;

FIGS. 8(a) and 8(b) illustrate input and output waveforms depicting the operation of the sync separator recovery circuit of the present invention;

FIGS. 9(a) and 9(b) illustrate input and output waveforms depicting the operation of prior art sync separators in the presence of thermal noise; and FIGS. 10(a), 10(b) and 10(c) illustrate waveforms depicting further aspects of the operation of the sync separator of FIG. 5.

Figure 1:
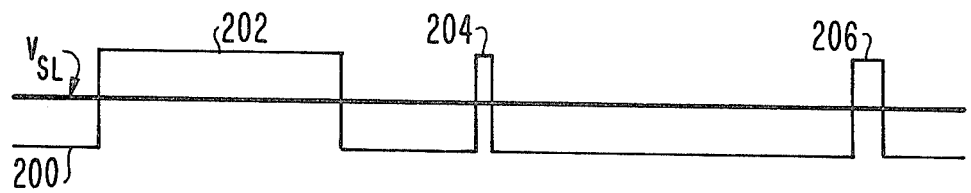

Referring to FIG. 1, a composite video signal 200 is shown, containing a vertical sync pulse 202, an equalizing pulse 204, and a horizontal sync pulse 206. In this FIGURE and in the other waveforms illustrated in this disclosure, the video signal level which normally appears between the horizontal sync pulses during the vertical scanning interval has been normalized to the black pedestal level at the base of the sync pulses. No attempt has been made to precisely represent sync pulse widths or the spacing between pulses, which are specified by the broadcast standards of each particular television system. In the NTSC system, vertical sync pulse 202 has a duration of approximately 27 microseconds; equalizing pulse 204 has a duration of approximately 2.5 microseconds; and horizontal pulse 206 has a duration of approximately 5 microseconds. The line duration, or periodicity, of the horizontal sync pulses is approximately 63.5 microseconds.

If the composite video signal 200 is an ideal signal of constant amplitude as shown in FIG. 1, a fixed slicing level $V_{SL}$ may be used. As the FIGURE illustrates, the ideal slicing level should slice through the center of the pulse, thereby minimizing the possibility of encountering noise set-up resulting from slicing too close to the sync tips or pedestal level. The sync separator will therefore produce a sync pulse when each leading edge exceeds the slicing level, and will terminate the sync pulse when the trailing edge falls below the slicing level. The output sync signal will correspond directly to waveform 200.

Figure 6:
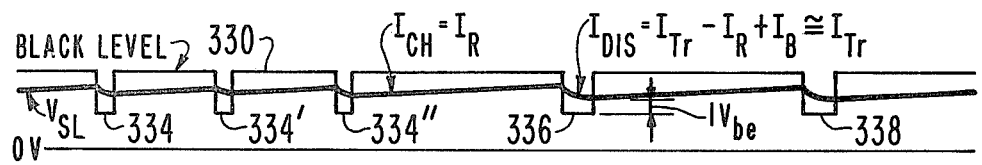
FIG. 6 illustrates waveforms depicting the operation of the sync separator of FIG. 5.

However, since video singal levels vary with changes in the level of the received television signal, means must be provided to allow the sync separator slicing level to follow these changes. A sync separator which will track these signal level changes is illustrated in FIG. 6 of U.S. Pat. No. 3,869,586 issued to Ueda. The Ueda sync separator is comprised of a differential amplifier including two emitter coupled NPN transistors, and a level shift circuit, including two NPN follower transistors, a capacitor, and a resistor. A video signal is coupled to the base electrodes of the two emitter followers, and the emitter electrodes of these transistors are coupled to the two base inputs of the differential amplifier. The capacitor and resistor are coupled from the emitter electrode of one emitter follower to ground to form a peak detector.

Figure 2A:
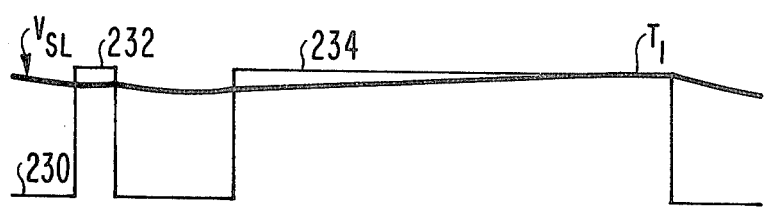
Figure 2B:
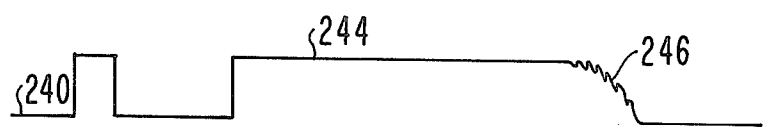

The operation of the Ueda sync separator is illustrated in FIGS. 2(a) and 2(b) of the present application. When a composite video signal containing a sync pulse is coupled to the bases of the emitter followers, the video signal is translated down one $V_{be}$ by one emitter follower and applied to one input of the differential amplifier, as shown by waveform 230. The other emitter follower also translated the signal down one $V_{be}$ and applies the translated signal across the peak detecting capacitor. A slicing level $V_{SL}$ is developed across the capacitor and applied to the other input of the differential amplifier. During each sync pulse, the slicing level $V_{SL}$ will increase as the capacitor is charged toward the peak of the level shifted signal. During an equalizing pulse 232, the slicing level $V_{SL}$ will increase, but will usually not reach the same tip level due to the short duration of the pulse. Between sync pulses, the slicing level $V_{SL}$ will decrease, as the capacitor is discharged by the resistor and the conduction of base current by the differential amplifier. This discharge causes the slicing level to vary and thereby follow changes in the video signal level.

However, when a vertical pulse 234 having a duration of approximately 27 microseconds is applied to the sync separator, the peak detecting capacitor is charged for a sufficient duration to cause it to charge to the peak of the level shifted signal at time $T_1$. At this time, the voltage levels on both inputs to the differential amplifier (i.e., the slicing level input and the video signal input) are equal. Since a two transistor differential amplifier requires a voltage differential of approximately 100 millivolts at the inputs to be maintained in a specific, stable state, the equal voltages at the inputs will cause the amplifier to become unstable. The output sync signal 240 will thus be in an indeterminate state or fluctuate due to noise switching during the time that the inputs to the differential amplifier are within 100 millivolts of each other, as illustrated by the jagged waveform 246 in FIG. 2(b). Therefore, the output pulse 244 produced by the Ueda sync separator will have a duration which is less than that of the actual sync pulse, as well as a lower energy content, resulting in improper operation of the vertical deflection system in the television receiver.

Although the Ueda patent suggests that the aforementioned unstable condition may be prevented by providing different $V_{be}$ drops for the emitter follower transistors, this solution will be ineffective when the sync separator circuit is constructed in integrated circuit form. To produce unequal base-to-emitter voltages, the emitter-follower transistors must be constructed with unequal emitter areas on an integrated circuit chip. Typically, a 2 to 1 difference in emitter area will produce an 18 millivolt difference in $V_{be}$'s. Thus, a 4:1 emitter area ratio produces a 36 millivolt difference, and an 8:1 ratio produces a 54 millivolt difference. As a practical matter, an 8:1 difference in emitter area is the maximum that can be achieved, because higher ratios result in a prohibitively large area of the integrated circuit being occupied by the larger transistor. Since the 54 millivolt $V_{be}$ difference is less than the 100 millivolt difference required to maintain the state of the differential amplifier with certainty, it is seen that the unstable condition is still not cured.

FIG. 5 of the Ueda patent suggests a technique for solving the instability problem. This FIGURE shows the use of a $V_{be}$ voltage divider coupled between the emitter follower transistor and the differential amplifier on the video signal side of the differential amplifier. The voltage divider may be constructed so as to maintain a D.C. offset between the video signal input and the peak detector input of the differential amplifier when the peak detector has charged to the peak of the sync signal. However, the peak detector of this FIGURE consists of only the emitter follower charging transistor and a peak detecting capacitor coupled from the differential amplifier input electrode to ground; the discharge resistor coupled across the capacitor has been omitted. The operation of this circuit will be unpredictable, since it will have no response to signal fading or changes in signal level. This is because the only means for discharging the peak detecting capacitor is the base current conducted by the input electrode of the differential amplifier.

Figure 3A:
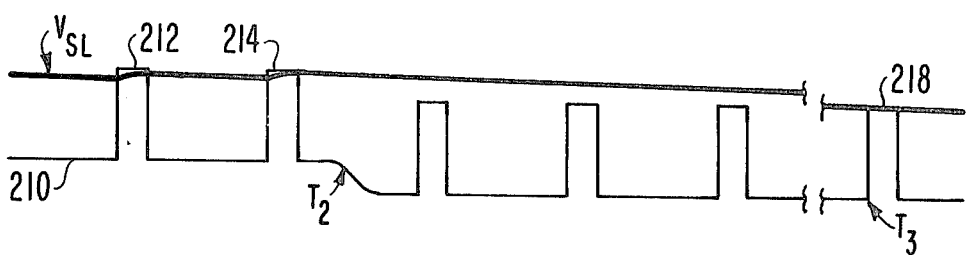
Figure 3B:
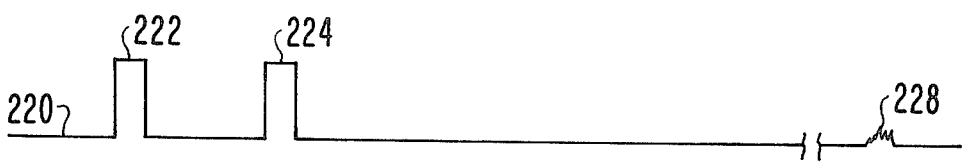

The operation of this circuit is illustrated in FIGS. 3(a) and 3(b) of the present application. FIG. 3(a) illustrates a video signal 210 containing sync pulses 212, 214 and 218 which is applied by the voltage divider to the video signal side of the Ueda sync separator. The peak detector generates a slicing level $V_{SL}$ on the other side of the differential amplifier, which slices sync pulses 212 and 214 to produce the output sync signal 220 of FIG. 3(b), containing separated sync pulses 222 and 224. At time $T_2$, the video signal 210 experiences a level shift due to signal fading or a television channel change. The slicing level $V_{SL}$, which changes only as base current is drawn from the peak detecting capacitor by the differential amplifier, decreases at a slow rate which is unable to follow this level shift, resulting in the loss of a substantial number of sync pulses in the output sync signal 220. Finally, at some later time $T_3$, the slicing level $V_{SL}$ drops to a level which intersects the tip of a sync pulse 218, thereby producing a small ripple 228 in the output sync signal 220. Thereafter, the sync separator would resume sync signal separation at the lower video signal level, but only after the loss of a substantial number of sync pulses and resultant loss of synchronization of the television receiver.

By combining the discharging resistor of FIG. 6 of U.S. Pat. No. 3,869,568 with the voltage divider circuit shown in FIG. 5 of that patent, a sync separator which combines the most favorable features taught by Ueda may be constructed. The resultant circuit, however, contains an inherent disadvantage when mass produced for a consumer product such as a television receiver. This disadvantage stems from the operation of the peak detector of the Ueda circuit. When a sync pulse is applied to the base electrode of the emitter follower charging transistor, the transistor provides charging current ($I_{Tr}$) to charge the peak detecting capacitor to the peak of the sync pulse. Some of this charging current is bypassed to ground by the conduction of the discharging resistor ($I_R$) during the charging period. Thus, the net charging current ($I_{CH}$) for the peak detecting capacitor is:

$$I_{CH} = I_{Tr} - I_R$$

But since the emitter follower charging current, $I_{Tr}$, is of an order of magnitude larger than the discharging current $I_R$ to ensure peak signal rectification, the net charging current $I_{CH}$ is essentially the emitter follower charging current, $I_{Tr}$.

Between sync pulses, the discharging resistor which bypasses the peak detecting capacitor is conducting current ($I_R$) from the capacitor to ground. The resistor and capacitor are coupled to the base electrode of a differential amplifier transistor, which is conducting base current ($I_B$) from the peak detecting capacitor during the discharge interval. The net discharging current ($I_{DIS}$) for the peak detecting capacitor is therefore:

$$I_{DIS} = I_R + I_B$$

Discharging the peak detecting capacitor changes the slicing level $V_{SL}$, and the voltage change of the slicing level establishes the ripple of the peak detector. It is desirable to minimize the ripple in the slicing level to maintain noise immunity in the sync separator; moreover, if the slicing level $V_{SL}$ decreases to the black level, the sync separator will interpret the sync pedestal level as a sync pulse, producing a phase-shifted, wider than nominal sync pulse. To minimize the problems caused by excessive slicing level ripple, the discharging current must be tightly controlled and kept to the minimum level which will permit satisfactory tracking of changes in video signal level. These constraints limit the selection of values of the peak detecting capacitor and discharging resistor and result in the discharging resistor current $I_R$ being of the same order of magnitude as the base current $I_B$ drawn by the differential amplifier transistor. Thus, both the resistor discharging current $I_R$ and the differential amplifier $I_B$ must be precisely known in order to determine the ripple of the slicing level $V_{SL}$ with any assurance.

But when the sync separator is mass produced in integrated circuit form, for example, this is not always possible. This is because the gain, $\beta$, of the differential amplifier can vary from circuit to circuit by a factor of five to one. Typical $\beta$ values for this transistor range from 30 to 150. Thus, the base current $I_B$ can vary over a range of five to one, resulting in wide fluctuation in the discharging current $I_{DIS}$ from circuit to circuit. Moreover, when variations in other circuit elements are taken into consideration, such as the emitter current of the differential amplifier transistor, the fluctuation can be even greater.

Figure 4A:
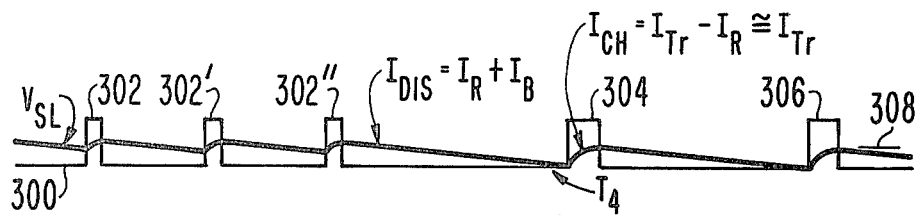
Figure 4B:
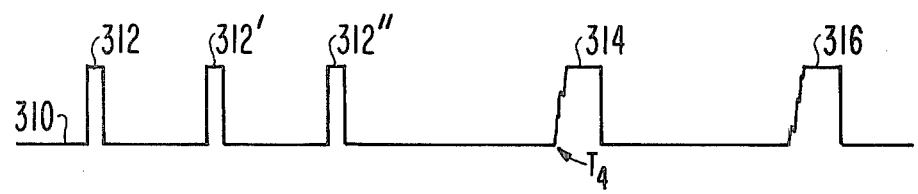

The problems engendered by this unpredictable discharging current $I_{DIS}$ are illustrated in FIGS. 4(a) and 4(b) of the present application. In FIG. 4(a), a typical low level (i.e., small amplitude) video signal 300 is shown containing equalizing pulses 302, 302' and 302'' and horizontal sync pulses 304 and 306. During each sync pulse, the slicing level $V_{SL}$ increases to a level 308 which is offset from the sync tip by the level shift of the voltage divider at the video signal input to the differential amplifier. Between sync pulses, the slicing level $V_{SL}$ decreases according to the expression $$I_{DIS} = I_R + I_B$$

If the discharging resistor is selected for a nominal gain of 50, for example, and the integrated circuit transistors have a gain in excess of this value, the result will be a sharper than expected decline in the slicing level $V_{SL}$ between sync pulses. During the interval between equalizing pulses 302, 302', 302", approximately 27 microseconds in the NTSC system, no adverse effects may occur, and the output sync signal 310 will contain properly separated sync pulses 312, 312', 312". However, the approximately 58 microsecond discharge interval between sync pulse 302" and horizontal sync pulse 304 can be sufficient time for the slicing level to decline to the pedestal level so that sync signal separation begins at time T4, rather than at the leading edge of the horizontal sync pulse 304. The resultant output sync signal 310 will contain a wider than nominal output pulse 314, which is the reverse of the problem illustrated in FIGS. 2(a) and 2(b), in which the output pulses were narrower than expected.

The wider sync signal pulses 314 and 316 can cause an even greater problem than narrow pulse 244 of FIG. 2(b). This is because the horizontal deflection system is normally keyed by the leading edge of the horizontal sync pulse. Since the leading edges of pulses 314 and 316 are phase shifted by the improper operation of the sync separator, the picture produced by the television receiver will have an undesirable black border along the right side, and the horizontal oscillator will fall out of phase lock with the horizontal sync signal.

An embodiment of the present invention which overcomes the aforementioned problems is illustrated in FIG. 5. A negative-going composite video signal is provided by a video amplifier 10 and coupled to a noise inverter 22 and a delay 12. The noise inverter 22 inverts impulse noise in the composite video signal which exceeds a predetermined threshold level. The delay 12 is an active filter which delays the composite video signal provided by video amplifier 10 by the lowpass filters comprised of resistors 122, 124 and 126 and capacitors 120 and 130. The delayed video signal is combined with inverted noise pulses from noise inverter 22 at the base of transistor 132, resulting in a noise-cancelled composite video signal. This signal is amplified by transistors 132 and 138, which provide a noise free video signal at the emitter of transistor 138. Feedback capacitor 120 provides waveshaping to the video signal which improves the transition time of the leading edges of the sync pulses. A full explanation of the delay 12 may be found in my U.S. patent application Ser. No. 934,829, entitled "Noise Cancellation Circuit", filed concurrently herewith.

The noise cancelled video signal is coupled from the emitter of output transistor 138 of the delay 12 to a sync separator circuit 40. The video signal is applied to a transistor 44 by a resistor 42 and to a PNP charging transistor 52 of a peak detector 50. A resistor 142 is coupled from the base of transistor 44 to the base of transistor 138. Resistors 42 and 142 comprise a voltage divider across the base-to-emitter junction of transistor 138, which is effective to couple a higher D.C. level video signal to the base of transistor 44 than that which is coupled to the peak detector 50. The collector of charging transistor 52 is coupled to a point of reference potential (ground). The peak detector 50 also includes a peak detecting capacitor 28 coupled from the emitter of transistor 52 to ground and a current source resistor 26 coupled from the emitter of transistor 52 to a source of supply voltage (+B). All of the previously described circuit elements of sync separator 40 may be constructed on a single monolithic integrated circuit chip, with the exception of resistor 26 and capacitor 28, which are coupled to the sync separator 40 at an external I.C. terminal 14.

Thermal noise detection is minimized in the embodiment of FIG. 5 by the inclusion of additional external circuit elements which reduce the bandwidth of the peak detector 50. A resistor 156 is coupled between the emitter of charging transistor 52 and external I.C. terminal 14. The parallel combination of a damping resistor 152 and an inductor 154 is coupled between the peak detector capacitor 28 and external I.C. terminal 14.

The collector of differential amplifier transistor 44 is coupled to the +B supply. The emitter of transistor 44 is coupled to the emitter of a second differential amplifier transistor 46, and to the collector of a constant current source transistor 48. The emitter of transistor 48 is coupled to ground. The base of transistor 48 is maintained at a controlled voltage level by its connection to a $V_{be}$ supply 30. The $V_{be}$ supply 30 is of the type described in my aforementioned U.S. patent application Ser. No. 934,829.

The peak detector 50 is coupled to the differential amplifier by the connection of resistor 56 from external I.C. terminal 14 to the base of transistor 46. The collector of differential amplifier transistor 46 is coupled to the base of a transistor 60 and to the +B supply by a resistor 58. The emitter of transistor 60 is coupled to the +B supply, and the collector of transistor 60 is coupled to an automatic gain control (AGC) keying circuit 70 and to the base of a transistor 160, which has its collector coupled to the +B supply and its emitter coupled to the base of a transistor 162. The collector of transistor 162 is coupled to the +B supply by a resistor 164, and the emitter of transistor 162 is coupled to an external I.C. terminal 16. Shown connected to terminal 16 is an R-C load comprised of a resistor 166 and a shunt capacitor 168 coupled in parallel between terminal 16 and ground. The output sync signal there developed is coupled to the horizontal and vertical deflection circuits in the television receiver (not shown).

The AGC keying circuit 70 generates a keying signal for an AGC circuit 20 upon the coincidence of a pulse from the sync separator with a pulse from a keying pulse source 72. The keying pulse source may be, for example, the horizontal flyback transformer in the deflection system of a television receiver (not shown). The AGC keying circuit 70 may be of the type described in my U.S. patent application Ser. No. 934,835, entitled "AGC Keying Signal Circuit", filed concurrently herewith. The AGC circuit 20 is responsive to the keying signal for the development of an AGC control voltage which varies with the level of the sync tips of the composite video signal. The AGC control voltage is used to vary the gain of the R.F. and I.F. amplifying stages of the television receiver (not shown). The AGC circuit 20 may be of the type described in my U.S. patent application Ser. No. 934,823, entitled "Keyed AGC Circuit," filed concurrently herewith.

The AGC keying circuit 70 is also coupled to a sync separator recovery circuit 80 at the base of a transistor 82. Transistor 82 has its emitter coupled to ground and its collector coupled to the +B supply by the serial connection of a resistor 84 and a diode 86. Diode 86 has its anode coupled to the +B supply and its cathode coupled to resistor 84. The collector of transistor 82 is also coupled to the base of a transistor 90, which has its emitter coupled to the +B supply by a resistor 92 and its collector coupled to the peak detector 50 at external I.C. terminal 14.

Differential amplifier transistor 44 is normally conducting and transistor 46 is normally nonconducting. Upon reception of a negative-going composite video signal containing a sync pulse, transistor 52 of the peak detector 50 will begin to charge capacitor 28 to a voltage which is one $V_{be}$ above the negative-going sync pulse tip at the emitter of transistor 138. The voltage stored by capacitor 28, which establishes the slicing level of the sync separator relative to the sync signal tip, is coupled to the base of transistor 46 by the parallel combination of resistor 152 and inductor 154 and resistor 56.

The negative-going sync pulse which is coupled to the base of differential amplifier transistor 44 quickly falls below the slicing level voltage at the base of transistor 46, causing transistor 44 to come out of saturation and transistor 46 to begin conduction. The conduction of current by transistor 46 causes transistor 60 to begin conducting, thereby generating a positive-going sync signal at the collector of transistor 60 which is coupled by transistors 160 and 162 to external I.C. terminal 16.

The operation of sync separator 40 of FIG. 5 is illustrated by the video signal waveform of FIG. 6, which contains equalizing pulses 334, 334' and 334'' and horizontal sync pulses 336 and 338. The pulses extend negatively from a black level 330 which is negative with respect to a more positive white level 332. Video signal information normally has amplitude levels varying between the black level 330 and the white level 332. The slicing level $V_{SL}$ at the base of transistor 46 slices through the synchronizing signal components, as shown.

During sync pulse intervals, transistor 52 ($I_{Tr}$) discharges the peak detecting capacitor 28 to a level which is approximately one $V_{be}$ above the sync tip level at the emitter of transistor 138. External charging resistor 26 is also providing charging current ($I_R$) and transistor 46 is conducting base current ($I_B$) during this time. These latter two currents are of approximately the same magnitude and tend to offset each other; moreover, both of these currents are outweighed by the discharging current $I_{Tr}$ of transistor 52, which is of an order of magnitude greater than either of them. Thus, the sync pulse interval discharging current is:

$$I_{DIS} = I_{Tr} - I_R + I_B \approx I_{Tr}$$

Between sync pulse intervals, peak detecting capacitor 28 is charged by external charging resistor 26, thereby establishing the ripple of the slicing level $V_{SL}$. During this time, transistors 52 and 46 are not conducting current, and the charging current is:

$$I_{CH} = I_R$$

Therefore, it is seen that the slicing level ripple can be precisely controlled by selecting appropriate values for charging resistor 26 and peak detecting capacitor 28.

Furthermore, since the slicing level ripple is independent of the characteristics of the integrated circuit elements of the sync separator, the circuit may be mass produced without any variations in peak detector operation.

If it is desirable to operate the sync separator 40 with a one $V_{be}$ offset between the slicing level $V_{SL}$ and the sync tips, as illustrated in FIG. 6, resistor 142 may be omitted from the circuit of FIG. 5. However, if it is desired to maintain the offset at a value less than one $V_{be}$, as may be desired when operating at low video signal levels, resistor 142 may be added as shown to form a $V_{be}$ voltage divider in cooperation with resistor 42. The effect of the two resistors when connected as shown is to shift the video signal level in a direction which minimizes the offset between the bases of transistors 44 and 46 to less than one $V_{be}$ when the peak detecting capacitor is discharged to its minimum value. The offset should not be reduced to less than 100 millivolts, however, to ensure switching stability of the differential amplifier, as discussed previously.

When the television receiver experiences a sudden signal fade, or is switched from a strong channel to a weak channel, it is possible for the tips of the negative-going sync pulses to be located substantially above the slicing level $V_{SL}$ until the gain control circuits return the video signal to normal levels. During this time, synchronization will be lost, as the sync separator is unable to peak detect the level shifted sync pulses. This operation is illustrated by the waveforms shown in FIGS. 7(a) and 7(b), which represent input and output waveforms of a peak detecting sync separator. Video signal 350 contains sync pulses 352 and 354, which are separated in the normal manner as they exceed the slicing level $V_{SL}$. At time $T_5$, waveform 350 experiences a sudden level shift, which increases the sync tip level of succeeding sync pulses 358–362. Thereafter, the slicing level $V_{SL}$ rises at an even rate at the charging resistor charges the peak detecting capacitor. Finally, the slicing level begins to slice through the sync tips at sync pulse 362 and sync separation commences with broken waveform 366 in the output sync signal 364. Thereafter, normal sync separation resumes, but only after sync pulses 358 and 360 have been lost. However, the sync separator of the present invention will recover quickly from this loss-of-sync condition due to the operation of the sync separator recovery circuit 80.

The loss-of-sync condition is detected by the AGC keying circuit 70, which senses that pulses from the sync separator 40 are no longer in coincidence with pulses from the keying pulse source 72. The AGC keying circuit 70 will respond to this condition by coupling pulses from the keying pulse source 72 to the sync separator recovery circuit 80, thereby keying the recovery circuit 80 into operation. The keying pulses will cause transistor 82 to conduct, which will in turn cause transistor 90 to conduct current from the +B supply to the peak detector 50 at external I.C. terminal 14. Current from transistor 90 augments the charging current provided by resistor 26, thus rapidly increasing the voltage stored on capacitor 28. Slicing level $V_{SL}$ quickly moves upward toward the sync pulse level of the weak video signal until peak detection commences and sync signal separation resumes. The recovery circuit 80 thus causes the sync separator 40 to respond rapidly to decreases in signal level, without the usual necessity of using small value components for capacitor 28 and resistor 26.

These components can therefore have relatively large values, which minimizes the ripple of the slicing level voltage $V_{SL}$.

The operation of the sync separator recovery circuit 80 is illustrated by the input and output waveforms shown in FIGS. 8(a) and 8(b). Video signal waveform 370 is identical to waveform 350 of FIG. 7(a), having a sudden level shift at time $T_5$ subsequent to sync pulse 372. The slicing level $V_{SL}$ rises between sync pulses 372 and 374 as the peak detecting capacitor 28 is charged by current from resistor 26. At time $T_6$, the AGC keying circuit 70 detects a keying pulse from source 72 which is not coincident with a sync pulse from transistor 60. The AGC keying circuit 70 will respond by keying transistors 82 and 90 of the recovery circuit 80 into conduction, thereby causing current to flow into the peak detecting capacitor 28 through the emitter-to-collector path of transistor 90. This additional charging current causes the slicing level $V_{SL}$ to rise at a faster rate until the keying pulse from source 72 terminates at time $T_7$, at which time the slicing level rise is again controlled solely by resistor 26. However, the slicing level has now shifted upward sufficiently to detect the next sync pulse 378. Thereafter, normal sync separation resumes. As the output sync signal 380 of FIG. 8(b) illustrates, only sync pulse 374 is lost when the slicing level $V_{SL}$ is modified by the charging action of the sync separator recovery circuit 80.

When the sync separator 40 is operated at very low signals levels, the ratio of the signal level to the level of thermal noise riding on the video signal decreases substantially, as illustrated by waveform 250 in FIG. 9(a). Video signal 250 is seen to contain a substantial amplitude of thermal noise riding on the black level and sync tip level. When the slicing level $V_{SL}$ of the peak detector 50 slices the sync pulses below the thermal noise, as illustrated by equalizing pulse 250, an accurate output sync pulse is produced, as shown by pulse 262 is output sync signal 260 of FIG. 9(b). But when a broad vertical sync pulse 256 is received by the sync separator 40, the peak detector 50 has sufficient time to charge to its maximum level, and can slice through the thermal noise level. The peak detecting capacitor will then retain a charge which represents a slicing level $V_{SL}$ offset from the peak of the thermal noise 258, instead of offset from the average sync tip level 254. The higher slicing level $V_{SL}$ will cause succeeding pulses to be sliced even closer to the thermal noise level. If resistor 142 is used to move the slicing level closer to the sync tip, the problem of thermal noise slicing is even further aggravated, as illustrated by FIG. 9(a), in which the slicing level $V_{SL}$ is shown to be intersecting vertical sync pulse 256 virtually at the sync tip. The result of thermal noise slicing is the broken output sync pulse 266 shown in FIG. 9(b), caused by high frequency thermal noise switching of the differential amplifier of the sync separator 40.

The present invention overcomes the problem of thermal noise switching in several ways. First, the peak detector 50 in FIG. 5 uses a narrow bandwidth PNP transistor 52. This PNP transistor has a bandwidth of only 3 to 4 MHz, as opposed to the NPN transistors of prior art circuits, which have a nominal gain bandwidth product of 400–500 MHz. The narrow bandwidth PNP transistor 52 substantially attenuates high frequency noise in the peak detector 50, which presents a smoother reference voltage level $V_{SL}$ to the reference side of the differential amplifier, thereby minimizing high frequency noise switching of the sync separator 40.

The shift of the slicing level $V_{SL}$ due to detection of the thermal noise peaks instead of the true sync pulse tips is negated in peak detector 50 by the inclusion of a resistor 152 between transistor 52 and the peak detecting capacitor 28. The voltage drop across this resistor is effective to cause the slicing level $V_{SL}$ at the base of transistor 46 to represent the sync tip, rather than the thermal noise peak (offset by the $V_{be}$ drop of transistor 52). An inductor 154 provides a low impedance D.C path between the peak detecting capacitor and the differential amplifier. Resistor 152 cooperates with inductor 154 to damp any ringing which may be induced by the inductor. Furthermore, the R-L combination of resistor 152 and inductor 154 acts to present a high impedance path to high frequency noise in the peak detector 50, while presenting a low impedance path to the reference level voltage $V_{SL}$. Resistor 156 provides additional filtering of the signal at the emitter of transistor 52.

Although high frequency noise is attenuated at the reference side of the differential amplifier, noise components can still appear in the output sync signal at the collector of transistor 46 due to signal coupling through the base-to-emitter junction of transistor 44 into the emitter electrode of transistor 46. Thermal noise can cause high frequency switching of the differential amplifier, producing the broken waveform 280 of FIG. 10(a) at the collector of transistor 46. Much of the pulse energy of sync pulse 280 is depleted by these noise spikes, which will cause improper operation of the integrator of the vertical deflection system, which relies upon an accurate energy content of the vertical sync pulses to begin the vertical retrace interval at the correct time. The energy content of sync pulse 280 is improved in the present invention by the use of PNP output transistor 60, which has a narrow bandwidth. PNP transistor 60 acts to attenuate the noise spikes of sync pulse 280, thereby producing an improved sync pulse 282 at its collector electrode, as illustrated in FIG. 10(b).

The sync pulse 282 of FIG. 10(b) is further improved by the addition of an emitter follower output stage at the collector of transistor 60, which drives a capacitive load. The collector of transistor 60 is coupled to transistors 160 and 162, which comprise a Darlington configuration output stage, with a combined emitter-to-base breakdown potential of 12 volts, thus providing a high voltage sync signal at external I.C. terminal 16. An external capacitive load is coupled to the output stage, comprising the parallel combination of a resistor 166 and a capacitor 168 coupled between terminal 16 and ground. Transistors 160 and 162 provide a sharp pull-up (fast risetime) for the trailing edges of noise spikes and the leading edges of sync pulses in the output signal. Moreover, since the Darlington pair is driving a capacitive load, the leading edges of the noise spikes and the trailing edges of the sync pulses will have a decay, or falltime, which is slower than the fast pull-up. As a result, the depth of the noise spikes in the sync pulses at terminal 16 is sharply attenuated. This is illustrated by sync pulse 284 in FIG. 10(c). This waveform clearly illustrates that the depth of the noise spikes in the sync pulse 282 at the base of transistor 160 has been reduced by the slow decay, fast pull-up characteristics of the emitter follower output stage and capacitive load at terminal 16. Thus, sync pulse 284 had virtually the same energy content as a noise-free sync pulse even in the presence of thermal noise, thereby permitting accurate integration of the vertical sync pulses by the vertical integrator.

What is claimed is:

1. A synchronizing signal separator circuit for deriving a synchronizing signal from a composite video signal comprising:

means for supplying a composite video signal having a white video signal level and synchronizing signal components, the peaks of said synchronizing signal components being at a signal level which is intermediate said white video signal level and a reference potential;

a differential amplifier having an output for generating a separated synchronizing signal and including first and second transistors of like conductivity type, the base electrode of said first transistor being coupled to receive said composite video signal from said supplying means;

a peak detector including a current source and a capacitor serially coupled between a source of supply voltage and said reference potential, and a third transistor of opposite conductivity type to that of said first and second transistors and having a collector to emitter path coupled across said capacitor and a base electrode coupled to receive said composite video signal from said supplying means; and means for rendering the base electrode of said second transistor responsive to the peak signal level developed on said capacitor, wherein the current supplied by said current source is the sole source of current for said capacitor when said third transistor is not conducting, and the peak signal level developed on said capacitor when said third transistor is conducting differs from the peak level of the composite video signal provided by said supplying means to the base electrode of said third transistor by at least the junction potential of said third transistor.

2. The synchronization signal separator circuit of claim 1, wherein:

said supplying means comprises a fourth transistor disposed as an emitter follower and having an input electrode for receiving a composite video signal and an output electrode directly connected to the base electrode of said third transistor, and a voltage divider having first and second input terminals coupled to the respective input and output electrodes of said fourth transistor, and an output terminal intermediate said first and second input terminals directly connected to the base electrode of said first transistor.

3. The synchronizing signal separator circuit of claim 1 or 2, further comprising:

means responsive to the output of said differential amplifier for varying the signal level developed across said capacitor when the synchronizing signal components of the composite video signal at the base electrode of said first transistor do not exceed the signal level developed across said capacitor.

4. The synchronizing signal separator circuit of claim 1 or 2, wherein:

the composite video signal supplied by said supplying means has a given bandwidth; and said peak detector exhibits a response characteristic having a bandwidth which is substantially less than said given bandwidth.

5. The synchronizing signal separator circuit of claim 3, wherein:

the composite video signal supplied by said supplying means has a given bandwidth; and said peak detector exhibits a response characteristic having a bandwidth which is substantially less than said given bandwidth.

6. A synchronizing signal separator circuit for deriving a synchronizing signal from a composite video signal comprising:

peak detecting means for generating a reference voltage related to the synchronizing signal components of said composite video signal;

differential amplifier means responsive to said composite video signal and said reference voltage for generating a separated synchronizing signal when the synchronizing signal components of said composite video signal exceed said reference voltage level; and means responsive to the output of said differential amplifier for varying said reference voltage level when the synchronizing signal components of said composite video signal do not exceed said reference voltage level.

7. The synchronizing signal separator circuit of claim 6, wherein:

said peak detecting means includes a resistor and a capacitor serially coupled between a voltage source and a reference potential; and said means for varying the reference voltage level of said peak detecting means includes a transistor having its collector to emitter path coupled in parallel with said resistor.

8. The synchronizing signal separator circuit of claim 6, wherein:

said composite video signal has a given bandwidth and said peak detecting means exhibits a response characteristic having a bandwidth which is substantially less than said given bandwidth.

9. A synchronizing signal separator circuit for deriving a synchronizing signal from a composite video signal comprising:

a source of composite video signals;

a differential amplifier including a first transistor having a base electrode coupled to said source of composite video signals, and an emitter electrode, a second transistor having an emitter electrode coupled to the emitter electrode of said first transistor, and a base electrode, and a constant current source coupled to the emitters of said first and second transistors;

a voltage source having first and second terminals; and a peak detector including a third transistor having a base electrode coupled to said source of composite video signals, an emitter electrode coupled to the base of said second transistor, and a collector electrode coupled to the first terminal of said voltage source, a current source resistor coupled between the second terminal of said voltage source and the emitter electrode of said third transistor, and a capacitor coupled between the emitter electrode of said third transistor and the first terminal of said voltage source.

10. The synchronizing signal separator circuit of claim 9, further comprising:
a source of keying signals;
a fourth transistor having its base electrode coupled to said source of keying signals and its emitter electrode coupled to said source of reference potential and a fifth transistor having its base electrode coupled to the collector electrode of said fourth transistor, its emitter electrode coupled to said voltage source and its collector electrode coupled to the junction of said resistor and said capacitor,
wherein said keying signals are effective to cause said fifth transistor to vary the voltage level of said capacitor.

11. The synchronizing signal separator circuit of claim 9, wherein:
said source of composite video signals comprises a fourth transistor disposed as an emitter follower and having an input electrode for receiving a composite video signal and an output electrode coupled to the base electrode of said third transistor, and a voltage divider having first and second input terminals coupled to the respective input and output electrodes of said fourth transistor, and an output terminal intermediate said first and second input terminals directly connected to the base electrode of said first transistor.

12. The synchronizing signal separator circuit of claim 11, wherein:
said composite video signals have a given bandwidth and said peak detecting means exhibits a response characteristic having a bandwidth which is substantially less than said given bandwidth.

13. A synchronizing signal separator circuit for deriving a synchronizing signal from a composite video signal comprising:
a source of input signals, said input signals comprising composite video signals having a given bandwidth and containing synchronizing signal components;
peak detecting means coupled to said source of input signals for generating a reference voltage related to the peaks of the synchronizing signal components of said composite video signals, said peak detecting means exhibiting a response characteristic having a bandwidth substantially less than that of said composite video signals; and
differential amplifier means responsive to said composite video signals and said reference voltage for generating a separated synchronizing signal when the synchronizing signal components of said composite video signals exceed said reference voltage level.

14. A synchronizing signal separator circuit for deriving a synchronizing signal from a composite video signal comprising:
a source of composite video signals containing synchronizing signal components;
peak detecting means coupled to said source of composite video signals for generating a reference voltage related to the peaks of the synchronizing signal components of said composite video signals;
differential amplifier means responsive to said composite video signals and said reference voltage for generating separated synchronizing signals which may be contaminated with noise components, said noise components comprising notches in said separated synchronizing signals which reduce the nominal energy content of said separated synchronizing signals, said notches having leading and trailing edges; and
means coupled to said differential amplifier means for shaping said separated synchronizing signals by imparting a fast risetime to said leading edges and a slow decay time to said trailing edges of said separated synchronizing signals and imparting a slow decay time to said leading edges and a fast risetime to said trailing edges of said notches,
wherein the energy reduction of said separated synchronizing signals due to noise contamination is substantially prevented.

15. The synchronizing signal separator of claim 14, wherein:
said shaping means comprises a first transistor having a base electrode coupled to an output of said differential amplifier means, a second transistor having a base electrode coupled to the emitter electrode of said first transistor, and a capacitive load coupled to the emitter electrode of said second transistor.

16. The synchronizing signal separator circuit of claim 14, wherein:
said composite video signals have a given bandwidth;
said peak detecting means exhibits a response characteristic having a bandwidth substantially less than that of said composite video signals; and further comprising:
means for coupling said composite video signals to said differential amplifier means, said coupling means having a bandwidth substantially greater than that of said peak detecting means.

17. The synchronizing signal separator circuit of claim 16, wherein:
said source of composite video signals comprises a transistor disposed as an emitter follower and having an input electrode for receiving a composite video signal and and output electrode coupled to said peak detecting means; and
said coupling means comprises a voltage divider having first and second input terminals coupled to the respective input and output electrodes of said transistor, and an output terminal intermediate said first and second input terminals coupled to said differential amplifier means.

18. The synchronizing signal separator circuit of claim 17, further comprising:
means responsive to an output of said differential amplifier means for varying said reference voltage when the synchronizing signal components of said composite video signal do not exceed said reference voltage level.

19. The synchronizing signal separator circuit of claim 16, wherein:
said peak detecting means comprises a transistor having a base electrode coupled to said source of composite video signals, a first resistor coupled from a voltage source to the emitter electrode of said transistor, a second resistor and a capacitor serially coupled between the emitter of said transistor and a source of reference potential, and an inductor coupled in parallel with said second resistor.

20. The synchronizing signal separator circuit of claim 16, wherein:
said peak detecting means comprises a PNP transistor having a base electrode coupled to said source of composite video signals, a resistor coupled from a voltage source to the emitter electrode of said PNP transistor, and a capacitor coupled from the emitter electrode of said PNP transistor to a source of reference potential.

* * * * *